No. 746,635. Patented December 8, 1903.

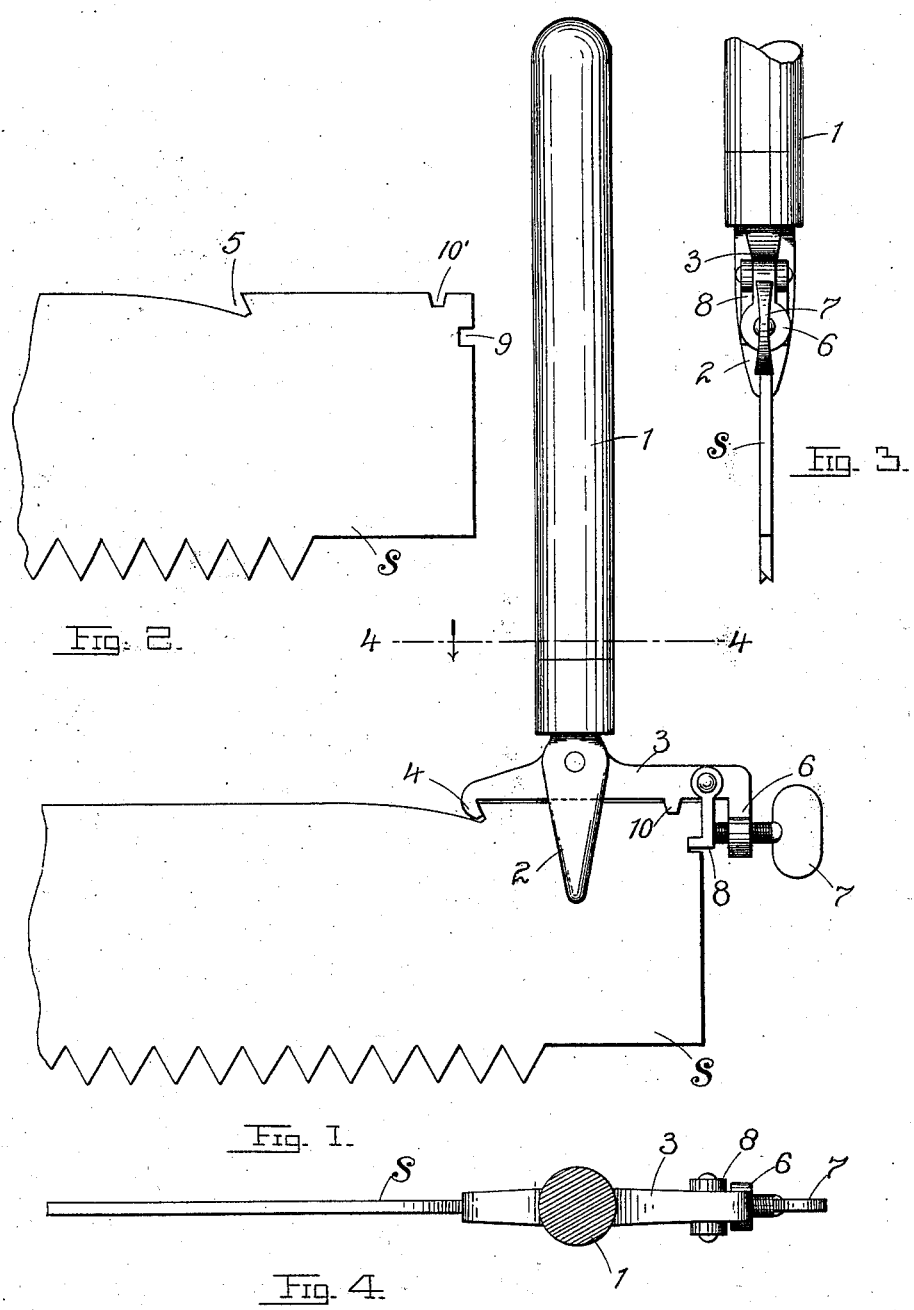

UNITED STATES PATENT OFFICE.

THOMAS LAUGHLIN, OF CABLE, WISCONSIN.

SAW-HANDLE.

SPECIFICATION forming part of Letters Patent No. 746,635, dated December 8, 1903.

Application filed March 9, 1903. Serial No. 146,879. (No model.)

*To all whom it may concern:*

Be it known that I, THOMAS LAUGHLIN, a citizen of the United States, residing at Cable, in the county of Bayfield and State of Wisconsin, have invented certain new and useful Improvements in Saw-Handles, of which the following is a full, clear, and exact description, reference being had to the accompanying drawings, forming a part hereof.

My invention has relation to improvements in crosscut-saw handles; and it consists in the novel construction of handle more fully set forth in the specification and pointed out in the claims.

In the drawings, Figure 1 is a side elevation of my invention applied to a saw. Fig. 2 is a plan of the saw. Fig. 3 is an end elevation of Fig. 1, and Fig. 4 is a section on line 4 4 of Fig. 1.

The object of my invention is to provide a handle for crosscut-saws which may be readily attached to or detached from the blade, one whose position shall be wholly above the upper edge of the blade, this being the most desirable position for the handle, and one possessing further and other advantages better apparent from a detailed description of the invention, which is as follows:

Referring to the drawings, 1 represents a handle one end of which is provided with a fork 2, at the base of which is riveted or otherwise rigidly secured a bar 3, which projects a suitable distance on either side of the fork. The inner end of the bar 3 terminates in a hook 4, which is adapted to engage a depression 5 along the upper edge of the blade S, the opposite or outer end of the bar terminating in a depending arm 6, which carries a clamping-screw 7, the inner end of the latter engaging a swinging pawl 8, pivoted to the bar directly to the rear of the arm 6. The free end of the pawl is adapted to engage a notch 9, formed in the end of the blade. Between the pawl 8 and the hook 4 the bar 3 is provided with a teat or lug 10, which rests in a depression 10', formed in the upper edge of the blade. By the arrangement as described the handle may be rigidly clamped to the blade and be detached therefrom at a moment's notice. The fork arms 2 prevent any lateral displacement of the blade, the remaining parts described insuring a rigid connection in other respects with the handle.

It is of course apparent that the details may be altered in minor particulars without departing from the nature or spirit of my invention.

Having described my invention, what I claim is—

1. A saw-handle comprising a handle proper, a fork at one end of the same, a rigid bar disposed at an angle to the handle located at the base of the fork, a hook at the inner end of the bar for gripping the upper edge of the saw, a pawl pivoted to the bar adjacent to the outer end thereof, and means carried by the bar for forcing the pawl against the adjacent end of the saw-blade, substantially as set forth.

2. A saw-handle comprising a handle proper, a forked extension at one end thereof, a rigid bar located at the base of and between the members of the fork, a hook at the inner end of the bar, a depending arm at the outer end of the bar, a binding-screw carried by the arm, a pivoted pawl located rearwardly of the arm, and secured to the bar, a teat or lug disposed along the lower edge of the bar between the pawl and hook, the parts operating substantially as, and for the purpose set forth.

In testimony whereof I affix my signature in presence of two witnesses.

THOMAS LAUGHLIN.

Witnesses:
WM. ALEXANDER,
J. E. MACCARTHY.